Jan. 9, 1968  M. O. FRASIER  3,362,382

PORTABLE FEEDER

Filed June 21, 1966

Merle O. Frasier
INVENTOR.

United States Patent Office 3,362,382
Patented Jan. 9, 1968

3,362,382
PORTABLE FEEDER
Merle O. Frasier, Benkelman, Nebr. 69021
Filed June 21, 1966, Ser. No. 559,229
5 Claims. (Cl. 119—58)

This invention relates to new and useful improvements in animal feeeders, and in particular the invention concerns itself with a feeder which is capable of holding a supply of hay and a supply of grain for self-feeding use of animals such as horses, and the like.

The principal object of the invention is to provide a feeder of this type which is of a very compact, portable nature, so that it may be effectively employed for practical and economical feeding of horses or other animals confined to a pen, corral, truck, trailer, or the like, especially during horse shows, cattle exhibitions, rodeos, and the like, where conventional stall facilities are not readily available.

As such, the portable feeder of the invention comprises a simple holder structure which is formed entirely from wire rods and which may be conveniently suspended from a suitable support, such as a corral board. The holder structure embodies a hay rack and a grain dish below the hay rack, both the hay in the rack and the grain in the dish being readily accessible by an animal to be fed. The arrangement is such that leaves and small parts of hay in the rack may fall into the grain dish for consumption by the animal along with the grain, so that waste of feed is virtually eliminated.

Also, the portable feeder of the invention is readily capable of being moved from place to place along with the animal to be fed, so that the animal becomes familiar with the feeder and conventional difficulties incident to feeding from unfamiliar sources thus do not arise.

The feeder of the invention is very simple in construction, efficient and dependable in operation and lends itself to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
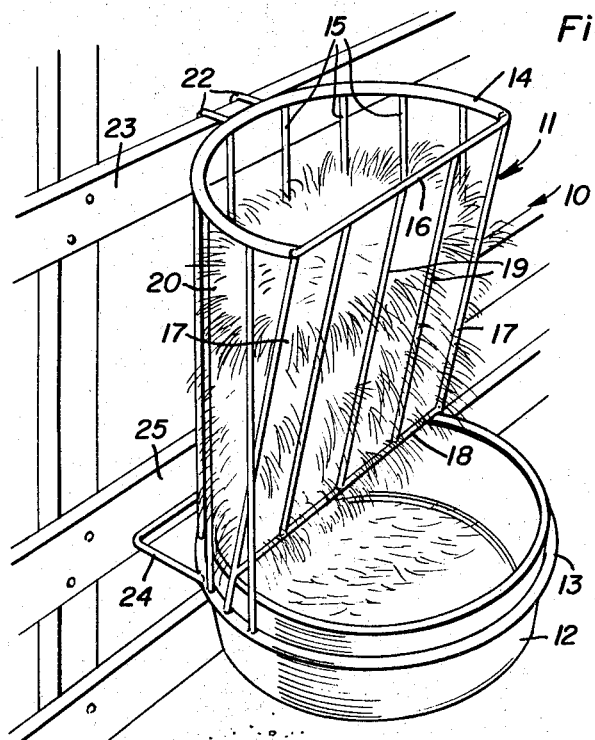
FIGURE 1 is a perspective view showing the portable feeder of the invention installed on a corral.
Figure 3:
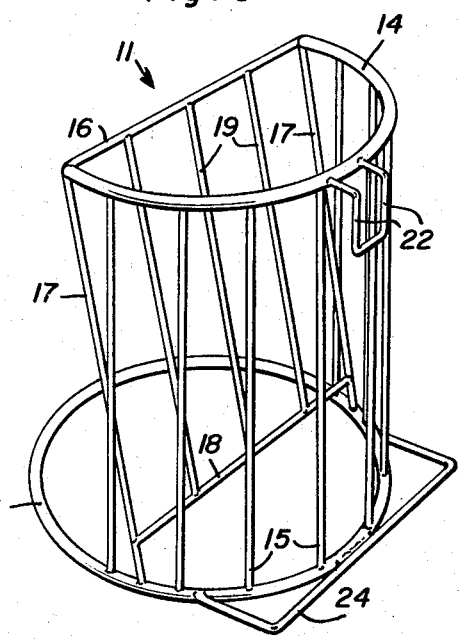
FIGURE 3 is a rear perspective view of the holder structure of the feeder.

Referring now to the accompanying drawings in detail, the portable feeder of the invention is designated generally by the reference numeral 10, the same comprising two primary components, namely, a holder structure 11 and a grain receiving dish 12 of a conventional type.

The holder structure 11 is formed entirely from wire rods and comprises a circular lower ring 13 in which the grain receiving dish 12 is removably positioned. The holder structure also includes a substantially semicircular upper ring member 14 which is spaced upwardly from the lower ring 13 in substantially concentric relation therewith.

A plurality of vertical bars 15 have their upper ends secured, as by welding, to circumferentially spaced points of the upper ring member 14, while their lower ends are similarly secured to corresponding, circumferentially spaced points of the lower ring 13, as will be clearly apparent.

An upper crossbar 16 extends transversely between the ends of the semi-circular upper ring member 14, and a pair of downwardly and rearwardly extending side bars 17 extend from the ends of the upper crossbar 16 to opposite side portions of the lower ring 14. Also, a lower crossbar 18 extends transversely between the side bars 17 in unwardly spaced relation from the lower ring 13, and a set of downwardly and rearwardly extending intermediate bars 19 extend between the upper and lower crossbars 16, 18, respectively, in parallel with the side bars 17.

As will be readily apparent from the drawings, the intermediate bars 19 coact with the side bars 17 and with the vertical bars 15 to provide a rack for reception of hay or similar other forage indicated at 20. The hay rack has a substantially semi-circular cross section with an open top defined by the upper ring member 14, so that hay may be conveniently placed in the rack through the open top for subsequent removal by a self-feeding animal indicated at 21 in FIGURE 2, such animal simply pulling the hay through the spaces existing between the bars 17, 19 at the front of the hay rack.

A suitable hook 22 is secured to the rear of the upper ring member 14 for suspending the entire holder structure 11 from a suitable support, as for example, one of the horizontal bars 23 of a corral. In addition, a substantially U-shaped horizontally disposed stabilizing bar 24 is secured to the rear portion of the lower ring 13 to supportably engage another board or rail 25 of the corral, thereby stabilizing the feeder and thus preventing the same from lateral rocking about the hook 22.

The aforementioned grain receiving dish 12 is removably supported in the lower ring 13 of the holder structure 11 below the hay rack, so that the grain in the dish is conveniently accessible to the animal and also, so that any leaves or loose pieces of hay in the hay rack may fall into the grain dish for consumption by the animal without undue wastage.

Figure 2:
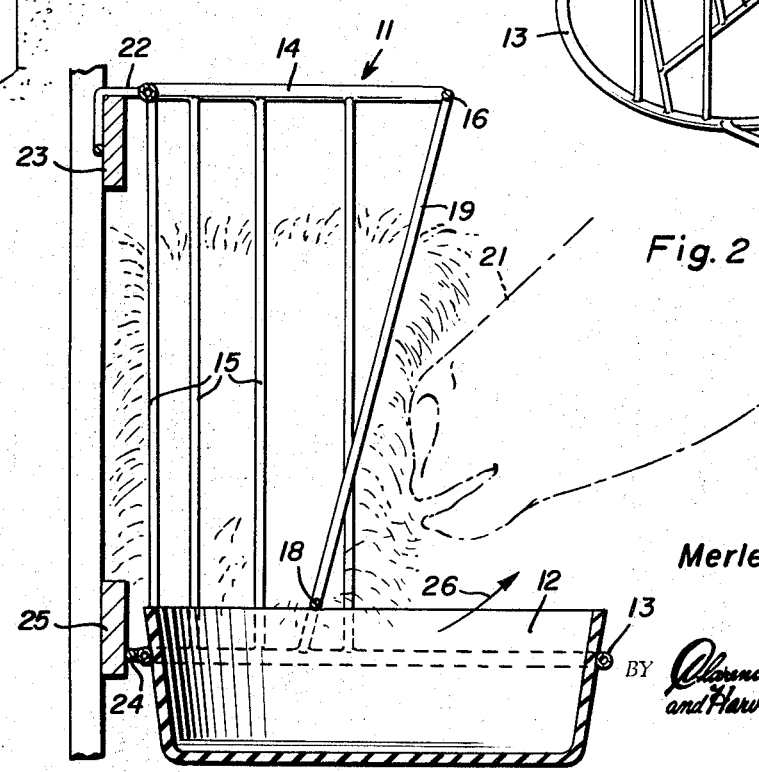
FIGURE 2 is a vertical sectional view thereof.

As will be apparent from FIGURE 2, the grain dish 12, which is of a conventional nature, has downwardly tapered side walls so that it is frictionally, but removably held in place in the lower ring 13. Moreover, to assist in retaining the grain dish in position, the lower crossbar 18 is so spaced above the ring 13 that it is abutted by the upper edge of the dish 12, as is best shown in FIGURE 2. The dish 12, of course, may be readily removed from the holder structure by pulling the same forwardly and upwardly, as indicated by the arrow 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable feeder of the character described, comprising in combination a holder structure formed entirely from wire rods and a grain receiving dish supported by said holder structure, said holder structure comprising a circular lower ring, a substantially semicircular upper ring member having front free ends and a rear curved portion spaced upwardly from said lower ring in substantially concentric relation therewith, a plurality of vertical bars secured at their upper ends to circumferentially spaced points of said upper ring member and extending downwardly therefrom, the lower ends of said vertical bars being secured to corresponding circumferentially spaced points of said lower ring, an upper cross bar extending transversely between the free ends of said semi-circular upper ring member, a pair of downwardly and rearwardly extending side bars extending from the ends of said upper crossbar to opposite side portions of said lower ring, a lower crossbar extending between said side bars in upwardly spaced relation from the lower ring, a set of downwardly and rearwardly extending intermediate bars extending between said upper and lower cross bars in parallel to said side bars, said intermediate bars and said side bars coacting with said vertical bars to provide above said lower ring a downwardly tapered hay rack of a substantially semi-circular cross-section with an open top defined by said semi-circular upper ring member and a hook provided at the rear portion of said upper ring member for suspending said holder structure from a support, said grain receiving dish being removably supported in said lower ring below said hay rack.

2. The device as defined in claim 1 together with a transversely extending stabilizing bar secured externally to the rear of said lower ring.

3. The device as defined in claim 1 wherein said dish removably positioned in said lower ring has its upper edge in abutment with said lower crossbar.

4. In a portable feeder of the character described, a holder structure formed entirely from wire rods and comprising a circular lower ring, a substantially semi-circular upper ring member having front free ends and a rear curved portion spaced upwardly from said lower ring in substantially concentric relation therewith, a plurality of vertical bars secured at their upper ends to circumferentially spaced points of said upper ring member and extending downwardly therefrom, the lower ends of said vertical bars being secured to corresponding circumferentially spaced points of said lower ring, an upper crossbar extending transversely between the free ends of said semi-circular upper ring member, a pair of downwardly and rearwardly extending side bars extending from the ends of said upper cross bar to opposite side portions of said lower ring, a lower cross bar extending between said side bars in upwardly spaced relation from the lower ring, a set of downwardly and rearwardly extending intermediate bars extending between said upper and lower crossbars in parallel to said side bars, said intermediate bars and said side bars coacting with said vertical bars to provide above said lower ring a downwardly tapered hay rack of a substantially semi-circular cross-section with an open top defined by said semi-circular upper ring member, and a hook provided at the rear portion of the upper ring member for suspending said holder structure from a support, said lower ring being adapted to removably receive a grain dish below said hay rack.

5. The device as defined in claim 4 together with a transversely extending stabilizing bar secured externally to the rear of said lower ring.

References Cited
UNITED STATES PATENTS

| | | | |
|---|---|---|---|
| 476,265 | 6/1892 | Hall | 119—58 |
| 493,040 | 3/1893 | Morse | 119—58 |
| 692,382 | 2/1902 | Swinton | 119—58 |

HUGH R. CHAMBLEE, *Primary Examiner.*